United States Patent [19]

Mizutani

[11] Patent Number: 4,891,665
[45] Date of Patent: Jan. 2, 1990

[54] FORWARD AND REVERSE ROTATION MECHANISM

[75] Inventor: Morikazu Mizutani, Tokyo, Japan

[73] Assignee: Canon Kabushiki Kaisha, Tokyo, Japan

[21] Appl. No.: 358,502

[22] Filed: May 30, 1989

Related U.S. Application Data

[63] Continuation of Ser. No. 13,118, Feb. 10, 1987, abandoned.

[30] Foreign Application Priority Data

Feb. 19, 1986 [JP] Japan .................................. 61-34726

[51] Int. Cl.$^4$ ............................................. G03B 27/62
[52] U.S. Cl. ..................................... 355/75; 355/234; 192/48.92
[58] Field of Search ................. 355/75, 233, 234, 235; 192/48.92, 51

[56] References Cited

U.S. PATENT DOCUMENTS 4,458,796 7/1984 Nitanda et al. .................. 192/48.92

Primary Examiner—Monroe H. Hayes
Attorney, Agent, or Firm—Fitzpatrick, Cella, Harper & Scinto

[57] ABSTRACT

The forward and reverse rotation mechanism of the present invention has a drive source rotatable in one direction, a first spring clutch for moving a forwardly and reversely moving member in a forward direction, a second spring clutch for moving the forwardly and reversely moving member in a reverse direction, a first lever for actuating the first spring clutch, a second lever for actuating the second spring clutch, and a solenoid for actuating one of the first and second levers. The lever actuated by the solenoid is selected, whereby movement of the forwardly and reversely moving member in the forward direction or the reverse direction is effected.

26 Claims, 6 Drawing Sheets

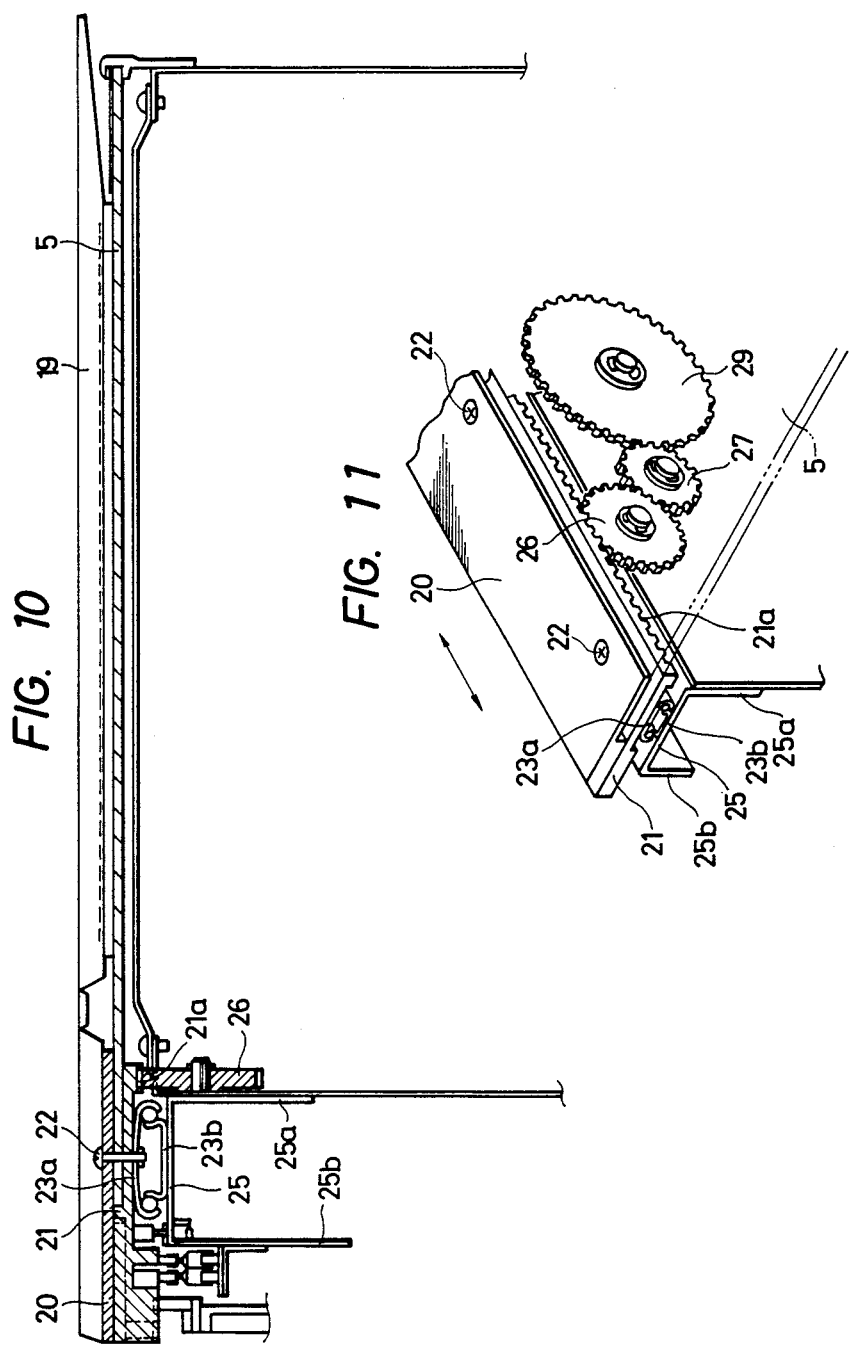

FORWARD AND REVERSE ROTATION MECHANISM

This application is a continuation of application Ser. No. 013,118 filed Feb. 10, 1987, now abandoned.

BACKGROUND OF THE INVENTION

1. Field of the Invention

This invention relates to a forward and reverse rotation mechanism for forward and reverse movement used in an original reading apparatus or the like, and in particular to such a mechanism for effecting rotation in one direction as a drive source.

2. Related Background Art

Forward and reverse rotation mechanisms for effecting forward and reverse movement of a rotatable member, a reciprocally movable member or the like, have heretofore been of the type which uses a motor effecting forward and reverse revolution as a drive motor, or of the type in which rotational force from a drive motor revolving in one direction is forwarded or reversed by the use of two electromagnetic clutches and by controlling these electromagnetic clutches.

However, the former has the disadvantage that the motor effecting forward and reverse rotation is expensive and difficult to control, and the latter has the disadvantage that although the motor revolves in one direction, the electromagnetic clutches are expensive and bulky.

In view of such problems, a mechanism which does not use a forwardly and reversely revolvable motor and magnetic clutches but utilizes two spring clutches to forward or reverse the one-way rotational force from the drive source revolving in one direction, is considered in U.S. Pat. No. 4,458,796.

Spring clutches are small and inexpensive as compared with electromagnetic clutches, and preferably enable the forward and reverse rotation mechanism utilizing them to be compact and low in cost.

However, in the construction described in the aforementioned U.S. Pat. No. 4,458,796, the connection between the motor and the original carriage is released only when the original carriage has been returned to its home position during the scanning of an original. That is, the connection between the motor and the original carriage cannot be released when the original carriage has been stopped outside its home position due to jam or erroneous opening of the main switch, and this leads to the problem that the original carriage is not freely moved.

Also, to stop movement of the original carriage outside its home position, revolution of the motor must be stopped. In this state, the connection between the motor and the original carriage is not cut off, and the inertia of the original carriage may adversely affect the forward and reverse rotation mechanism.

SUMMARY OF THE INVENTION

It is an object of the present invention to provide a forward and reverse rotation mechanism which is compact and inexpensive and in which the connection between a forwardly and reversely moving member can be released even when the forwardly and reversely moving member is in any other position than its home position.

It is another object of the present invention to provide a forward and reverse rotation mechanism which is compact and inexpensive and in which the connection between a forwardly and reversely moving member and a drive source can be released in whatever position the forwardly and reversely moving member may be.

It is still another object of the present invention to provide a forward and reverse rotation mechanism in which a forwardly and reversely rotating member can be stopped in any position even if a drive source is not stopped.

Further objects of the present invention will become apparent from the following description.

BRIEF DESCRIPTION OF THE DRAWINGS

FIG. 10 is a cross-sectional view showing an original carriage moving portion in FIG. 9.

FIG. 11 is a perspective view showing a driving portion in the embodiment of FIGS. 9 and 10.

DESCRIPTION OF THE PREFERRED EMBODIMENT

Figure 1:
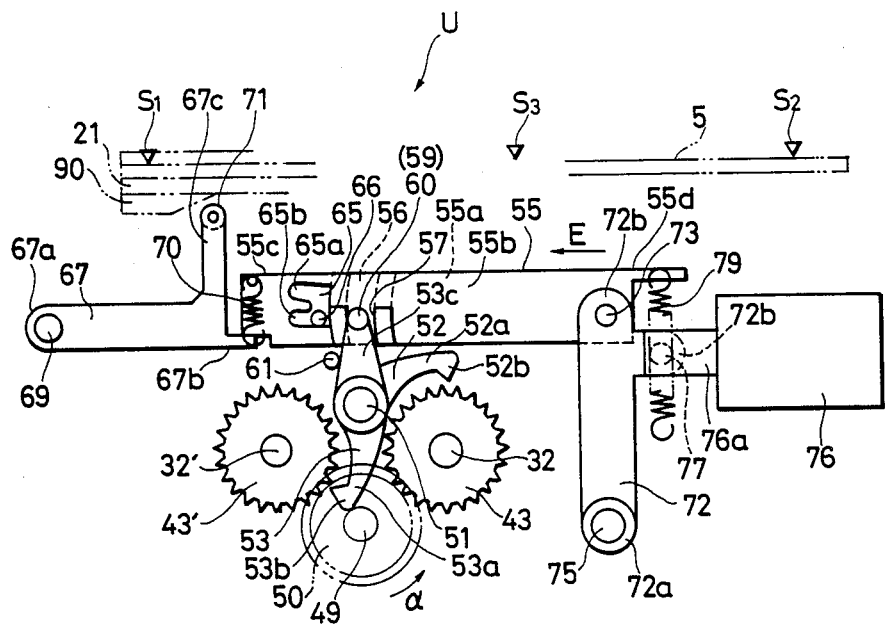
FIG. 1 is a side view of the forward and reverse rotation change-over device of a forward and reverse rotation mechanism according to an embodiment of the present invention.

An embodiment of the present invention will hereinafter be described with reference to the drawings in which similar members are given similar reference numerals.

Figure 9:
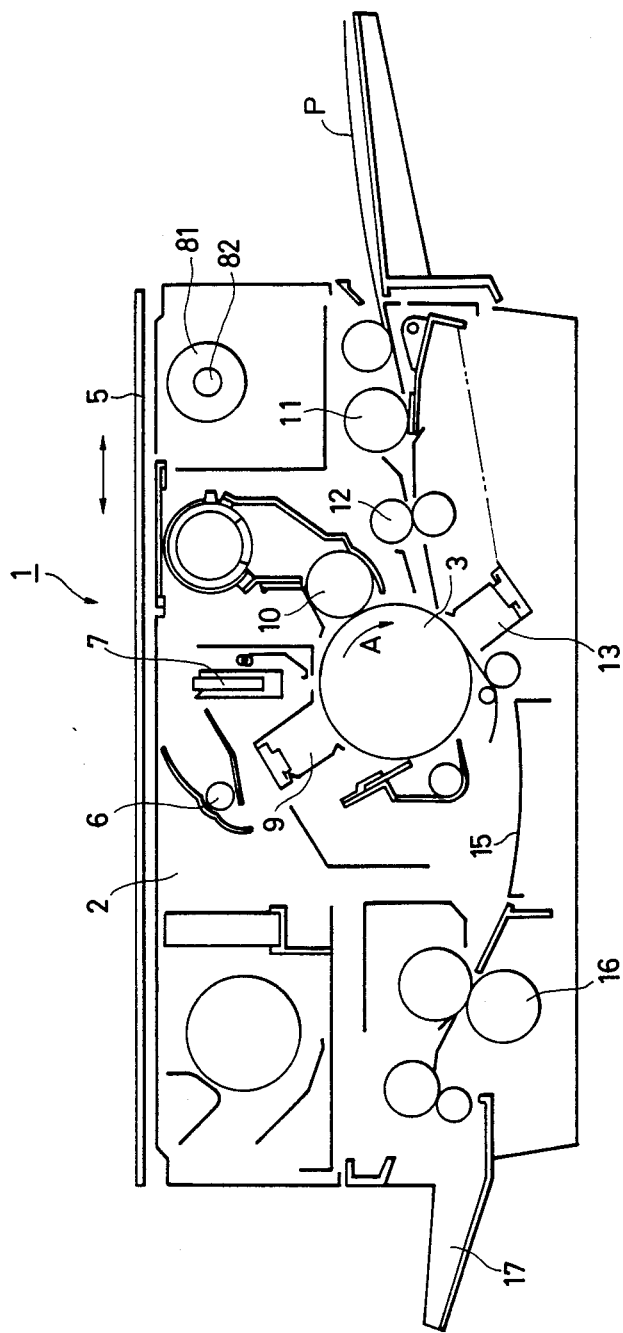
FIG. 9 is a side view of a copying machine to which the forward and reverse rotation mechanism of the present invention is applied.

A copying machine 1 having an original reading unit provided with a forward and reverse rotation mechanism M according to the present embodiment, is shown in FIG. 9. The copying machine has a photosensitive drum 3 substantially at the center of the body 2 thereof and has at the upper part thereof an original carriage 5 having a reciprocally movable transparent member and reciprocally movable in a predetermined range. An original placed on the original carriage 5 is slit-exposed by an illuminating lamp 6, and reflected light from the original is applied onto the photosensitive drum 3 rotated in the direction of arrow A, by an optical system comprising a convergent light transmitting member 7 or the like. Before being thus exposed, the drum 3 is uniformly charged by a charger 9 and an electrostatic latent image corresponding to the image of the original is formed on the drum 3 by the exposure. The electrostatic latent image is developed into a visible image by a developing device 10. On the other hand, a transfer material P is conveyed to the drum 3 by a paper feed roller 11 and register rollers 12 rotated in synchronism with the image on the photosensitive drum 3, and the image is transferred to the transfer material P by a transfer charger 13, and the transfer material is further guided by a guide 15 to a fixing device 16, where the image on the transfer material is fixed, whereafter the transfer material is discharged onto a discharge tray 17.

Now, the original carriage 5 is provided with an original pressing plate 19 for pressing the original in the upper portion thereof (see FIG. 10) and has an end portion 5a thereof held between an original keeping plate 20 and an original carriage mounting plate 21 and integrally secured to an upper slide rail 23a by means of a screw 22, as shown in FIGS. 10 and 11. A lower slide rail 23b corresponding to the upper slide rail 23a is provided on a U-shaped rail supporting frame member 25, on one side plate 25a of which is disposed an original carriage driving gear 26 which is in meshing engagement with a rack gear 21a formed on one end portion of the original carriage mounting plate 21. Further, a forward moving gear 27 and a backward moving gear 29 having a greater number of teeth than the forward moving gear 27 are disposed on the side plate 25a, and the forward moving gear 27 is in meshing engagement with the original carriage driving gear 26 and the backward moving gear 29. The original carriage 5 is reciprocally moved along the lower slide rail 23b by forward and reverse rotations of the original carriage driving gear 26. Reference numeral 81 designates a motor, and reference numeral 82 denotes the rotary shaft of the motor 81. The original carriage is moved by the revolutional force of this motor.

A forward and reverse rotation mechanism M for forwardly and reversely rotating the original carriage driving gear 26 is disposed on the U-shaped rail supporting frame member 25. The forward and reverse rotation mechanism M according to the present embodiment will hereinafter be described in detail with reference to FIGS. 1 to 8.

Figure 3:
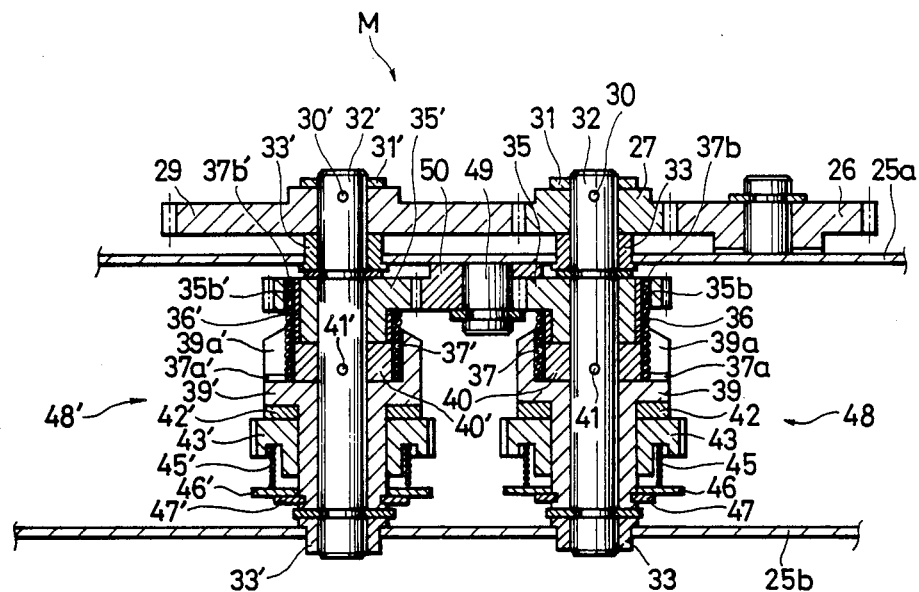
FIG. 3 is a transverse cross-sectional view of the forward and reverse rotation mechanism according to the embodiment present invention.
Figure 4:
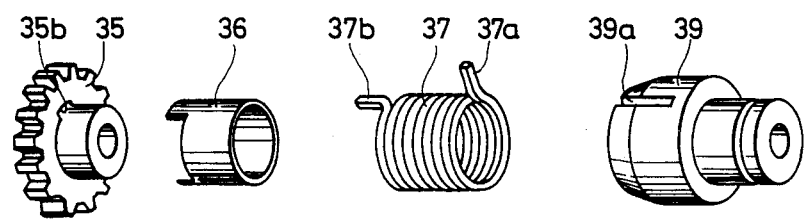
FIG. 4 is an exploded perspective view showing the clutch portion of the mechanism of FIG. 3.

The forward and reverse rotation mechanism M, as shown in FIG. 3, has the original carriage driving gear 26, the forward moving gear 27 and the backward moving gear 29 and is provided with a forward moving gear supporting shaft 32 to which the forward moving gear 27 is secured by means of a pin 30 and a grip ring 31, and a backward moving gear supporting shaft 32′ identical to the supporting shaft 32 to which the backward moving gear 29 is secured. The forward moving gear supporting shaft 32 is rotatably supported by bearings 33 and 33 provided on the side plates 25a and 25b, respectively, of the rail supporting frame member 25. In succession from that side on which the forward moving gear 27 is secured, a spring clutch gear 35, a coupling 36, a spring clutch 37 and a spring clutch receiver 39 are disposed on the supporting shaft 32 as shown in FIG. 4, the spring clutch gear 35 and the spring clutch receiver 39 being rotatable relative to the shaft 32. Further, a drum 40 is secured to the shaft 32 between the spring clutch gear 35 and the spring clutch receiver 39 by means of a pin 41, and the gap between the outer diameters of the drum 40 and coupling 36 and the inner diameter of the spring clutch 37 is between about 10 and 100 $\mu$m. The projected portion 37b of the spring clutch 37 fits in a hole 35b in the spring clutch gear 35, and the upright projected portion 37a of the spring clutch 37 fits in the groove portion 39a of the spring clutch receiver 39. A friction plate 42 and a ratchet wheel 43 provided with ratchet teeth are rotatably provided on the boss portion of the spring clutch receiver 39, the ratchet wheel 43 being biased by a pressing spring 45 so as to be urged against the friction plate 42. The pressing spring 45 is supported by a washer 46 and a fastening washer 47 which are provided on the spring clutch receiver 39. These members disposed on the forward moving gear supporting shaft 32 together constitute forward rotation spring clutch means 48 for transmitting forward rotation to the original carriage driving gear 26. On the other hand, backward moving members identical to the forward moving members disposed on the supporting shaft 32 for the above-described forward moving gear 27 are disposed on the backward moving gear supporting shaft 32′, and these members together constitute reverse rotation spring clutch means for transmitting reverse rotation to the original carriage driving gear 26, and these backward moving members are given reference numerals similar to those for the corresponding forward moving members but primed, and the description thereof is omitted herein. A drive gear 50 rotatably supported on a gear pin 49 and directly connected to a drive motor is provided between the spring clutch gears 35 and 35′, the drive gear 50 being in meshing engagement with the spring clutch gears 35 and 35′ and rotated in one direction to transmit one-way rotational force from the drive motor to these gears 35 and 35′.

Thus, the one-way rotational force from the drive motor is transmitted to the original carriage 5 through one of the spring clutches 37 and 37′, and the rotational force is converted to linear movement. Also, the original carriage is changed over between forward movement and backward movement by changing over the spring clutch which operates the connection between the drive gear 50 and the supporting shafts 32, 32′.

Figure 2:
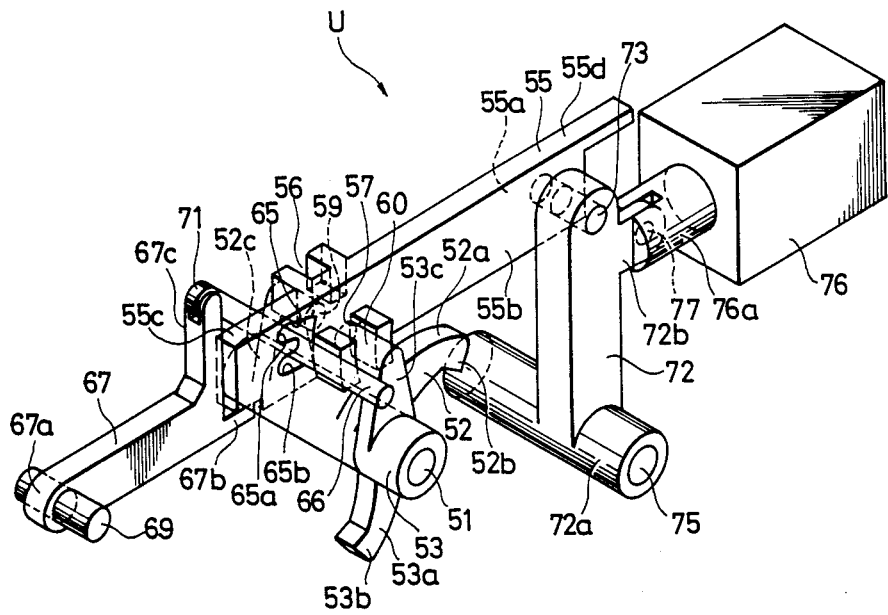
FIG. 2 is a perspective view of the device shown in FIG. 1.

Further, the forward and reverse rotation mechanism M has a forward and reverse rotation change-over unit U which will be described below. The forward and reverse rotation change-over unit U, as shown in FIGS. 1 and 2, is provided with a stopper supporting shaft 51 substantially intermediate of the ratchet wheels 43 and 43′, and a stopper 52 for forward movement and a stopper 53 for backward movement are rotatably supported on the supporting shaft 51. A plate-like stopper-actuating lever 55 is provided above the stoppers 52 and 53, a guide groove 56 for forward movement comprising a pair of ribs is formed above one side 55a of the actuating lever 55, and a guide groove 57 for backward movement is likewise formed below the other side 55b of the lever 55. The stopper 52 for forward movement is provided with a pawl portion 52b on one arm 52a thereof and has a guide pin 59 for forward movement on the other arm 52c thereof which faces said one side 55a of the stopper-actuating lever 55. The stopper 53 for backward movement is provided with a pawl portion 53b on one arm 53a thereof and has a guide pin 60 for backward movement coaxially with the guide pin 59 for forward movement on the other arm 53c thereof. A stopper pin 61 is provided which faces the other arms 52c and 53c of the stoppers 52 and 53 for forward movement and backward movement, respectively. Springs are disposed on the stoppers 52 and 53 for forward movement and backward movement, respectively, and these springs bias the respective stoppers 52 and 53 away from the corresponding ratchet wheels 43 and 43′ to thereby bring the arms 52c and 53c into contact with the stopper pin 61. Further, a positioning slot 65 is formed in the stopper-actuating lever 55 adjacent to the guide grooves 56 and 57, the slot 65 comprises an upper slot 65a and a lower slot 65b and a change-over guide pin 66 extends through the slot 65. A stopper change-over lever 67 is provided which faces one side edge 55c of the stopper-actuating lever 55, and one end 67a of the lever 67 is rotatably supported on a change-over pin 69. A forward movement change-over spring 70 is extended between the other end 67b of the lever 67 and one side edge 55c of the stopper-actuating lever 55, an upwardly extending arm 67c is provided on the lever 67, and a change-over roller 71 is rotatably disposed on the tip end of the arm 67c. A solenoid lever 72 is disposed on the other side edge 55d of the stopper-actuating lever 55 so as to be rockable through a lever pin 73, a boss portion 72a is formed on the lower end of the lever 72, a lever supporting shaft 75 secured to the apparatus body fits in the boss portion 72a, and the solenoid lever 72 is rockably supported on the supporting shaft 75. A solenoid 76 is disposed near the solenoid lever 72, and the projection 76a of the solenoid 76 is connected to the projected piece 72b of the solenoid lever 72 through a solenoid pin 77. A backward movement change-over spring 79 is extended between the other side edge 55d of the stopper-actuating lever 55 and the apparatus body and biases one side edge 55c of the stopper-actuating lever 55 upwardly. A change-over cam 90 is provided on the original carriage mounting plate 21, and this cam 90 is disposed at a position where it bears against the change-over roller 71 to press the stopper change-over lever 67 downwardly when the original carriage 5 is in its start position. A sensor S₁ for detecting the start position of the original carriage 5 and a sensor S₂ for detecting the reversal position of the original carriage 5 are provided on the body of the copying machine 1.

Operation of the above-described embodiment will now be described with reference to FIGS. 5 to 8.

Figure 5:
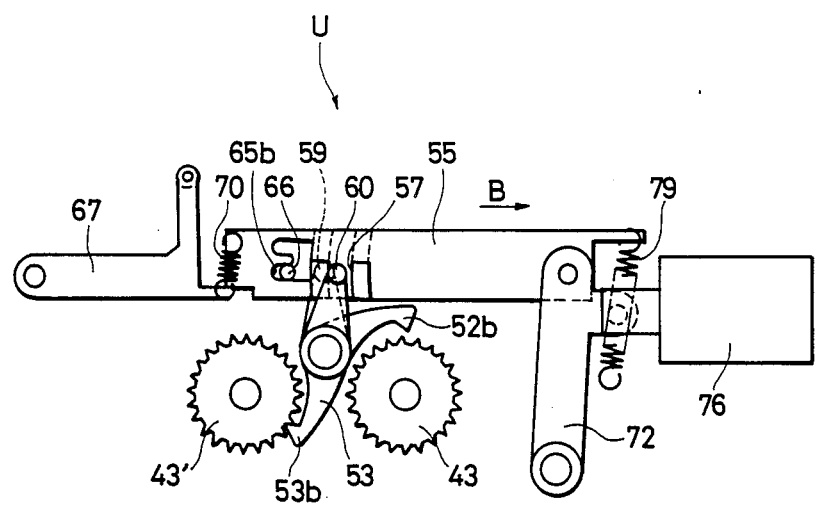
FIGS. 5 to 8 are side views showing the operating condition of the forward and reverse rotation change-over device in the embodiment of the present invention, FIG. 5 showing a state in which a stopper for backward movement is engaged with a ratchet wheel for backward movement, FIG. 6 showing the moved state of a forward movement change-over lever, FIG. 7 showing a state in which the stopper for backward movement is disengaged from the ratchet wheel for backward movement, and FIG. 8 showing a state in which a stopper for forward movement is engaged with a ratchet wheel for forward movement.

As regards the original carriage which is in any position within the range of reciprocal movement thereof, when a copy signal in the body of the copying machine 1 is produced, as shown in FIG. 5, the solenoid 76 of the forward and reverse rotation change-over unit U is operated and the stopper-actuating lever 55 is moved in the direction of arrow B through the solenoid lever 72. Here, the guide pin 60 for backward movement which fits in the guide groove 57 for backward movement is moved in accordance with the movement of the lever 55 and the stopper 53 for backward movement pivots clockwise to bring the pawl portion 53b thereof into engagement with the ratchet wheel 43' for backward movement.

Before the copy signal is input, the solenoid is in its deenergized state, and in any other position than the position in which the cam 90 presses the change-over roller, the positioning pin 66 always lies in the lower sot 65b. By the solenoid being energized, the positioning pin 66 comes into engagement with the lower slot 65b of the positioning slot 65 to thereby position the stopper-actuating lever 55. Now, prior to this, the drive gear 50 (see FIGS. 1 and 3) is rotatively driven in the direction of arrow α by a drive source, not shown, and the rotational force thereof is transmitted to the spring clutch gear 35 for forward movement and spring clutch gear 35' for backward movement which are in meshing engagement with the drive gear 50, whereby these gears 35 and 35' are rotated in the same direction. Further, the spring clutch receivers 39 and 39' are rotated with the gears 35 and 35' through the respective clutches 37 and 37' together with the friction plates 42 and 42', the ratchet wheels 43 and 43' and the pressing springs 45 and 45' which are provided on the boss portions of the spring clutch receivers and are idly rotating relative to the forward moving gear supporting shaft 32 and the backward moving gear supporting shaft 32'. When the ratchet wheel 43' for backward movement then engages the pawl portion 53b and the rotation thereof is controlled thereby, rotation of the spring clutch receiver 39' is also controlled through the adjacent friction plate 42'. The spring clutch 37' having its opposite projected portions 37a' and 37b' controlled by the spring clutch receiver 39' and the spring clutch gear 35' is tightened, and the spring clutch 37' tightens the coupling 36' rotated with the spring clutch gear 35' and the drum 40' secured to the backward moving gear supporting shaft 32', and the backward moving clutch gear 35' and the backward moving gear supporting shaft 32' are connected together through the drum 40', whereby the rotational force from the drive gear 50 is transmitted to the backward moving gear 29 and further, rotation in the direction opposite to the direction of arrow α is transmitted to the original carriage driving gear 26 through the forward moving gear 27. So, the original carriage 5 which is integral with the rack gear 21a which is in meshing engagement with the original carriage gear 26 is moved backward toward the start position, i.e., the original scanning start position, and comes close to the start position. On the other hand, the forward moving gear supporting shaft 32 is not connected to the clutch gear 35 for forward movement because the rotation of the ratchet wheel 43 for forward movement is not controlled, and the shaft 32 is rotated with the forward moving gear 27 driven by the backward moving gear 29.

Figure 6:
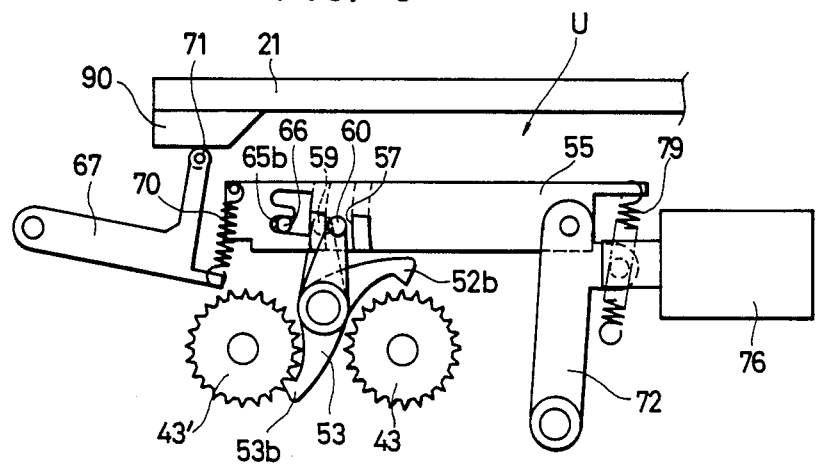

Further, when the original carriage 5 comes close to the start position, the change-over roller 71 is depressed by the change-over cam 90 provided on the end portion of the original carriage mounting plate 21 to press the roller 71 near the start position of the original carriage, as shown in FIG. 6, and the stopper change-over lever 67 is downwardly moved. If at such time, the solenoid 76 is in its energized state, the positioning pin 66 lies in the lower slot 65b of the positioning slot 65 and positions the stopper-actuating lever 55, which is thus not moved. When the original carriage 5 is slightly moved and arrives at the predetermined start position, the sensor S₁ detects it and releases the operation of the solenoid 76.

Figure 7:
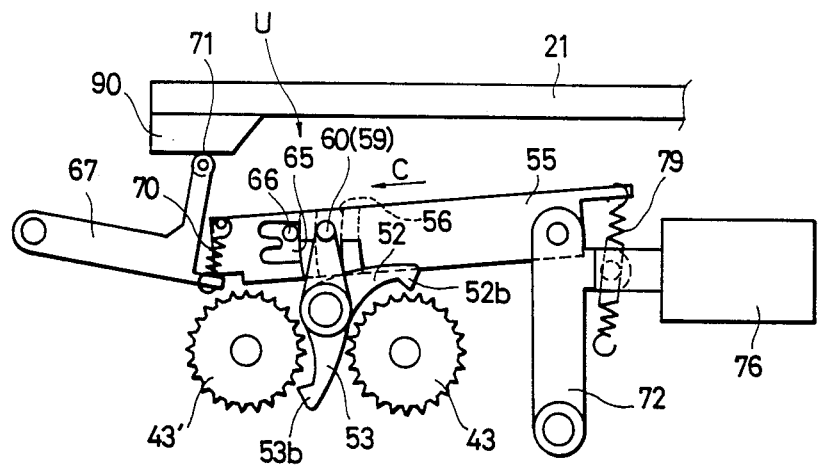

The portion of the cam 90 which presses the roller 71 is longer than the movement distance of the original carriage to the start position in which the solenoid becomes deenergized after the cam 90 has initially depressed the roller 71 and therefore, as shown in FIG. 7, the cam 90 still continues to depress the roller 71. Also, due to the deenergization of the solenoid, the stopper-actuating lever 55 is moved in the direction of arrow C and the stopper 53 for backward movement is pivoted counter-clockwise by the spring and comes to bear against the stopper pin 61, and the pawl portion 53b thereof becomes disengaged from the ratchet wheel 43' for backward movement, which is thus released from its controlled condition and is rotated, and the spring clutch 37' becomes relaxed with a result that the connection between the clutch gear 35' for backward movement and the supporting shaft 32' is released to cut off the rotational force from the drive gear 50.

Figure 8:
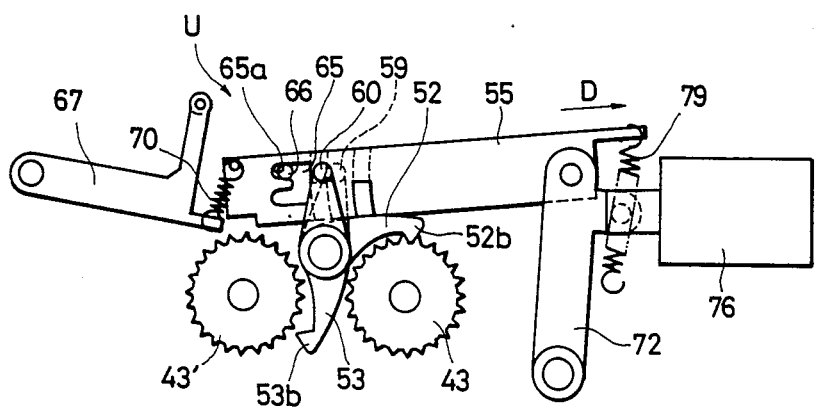

At this time, the stopper 52 for forward movement also bears against the stopper pin 61 and the pawl portion 52b thereof is out of engagement with the ratchet wheel 43 for forward movement and thus, the rotational force from the drive gear 50 is not transmitted to the supporting shafts 32 and 32' and the original carriage 5 is stopped at the predetermined start position. Also, when the solenoid becomes deenergized, the stopper-actuating lever 55 is moved in the direction of arrow C and also is displaced downwardly by the forward movement change-over spring 70 against the backward movement change-over spring 79, and the positioning pin 66 is moved to above the positioning slot 65. Also, with the downward displacement of the stopper-actuating lever 55, the guide pin 59 for forward movement fits into the guide groove 56 for forward movement. When the solenoid 76 is then energized, the stopper-actuating lever 55 is moved in the direction of arrow D as shown in FIG. 8, and the positioning pin 66 fits into the upper slot 65a of the positioning slot 65 to position the stopper-actuating lever 55. With the movement of the stopper-actuating lever 55 in the direction of arrow D, the stopper 52 for forward movement is pivoted clockwise and the pawl portion 52b of the stopper 52 engages the ratchet wheel 43 for forward movement to control the rotation of the latter. Since the guide pin 60 for backward movement is out of engagement with the guide groove 57 for backward movement, the stopper 53 for backward movement is not pivoted. When the rotation of the ratchet wheel 43 for forward movement is controlled, the spring clutch 37 is tightened as when the rotation of the ratchet wheel 43' for backward movement is controlled, and the rotational force from the drive gear 50 is transmitted to the forward moving gear supporting shaft 32 and further, the rotation in the same direction as the direction of arrow α (see FIG. 1) is transmitted to the original carriage driving gear 26 from the forward moving gear 27 rotated with the shaft 32, whereby the original carriage 5 is moved forward toward the reversal position (i.e., the original scanning terminating position). When the original carriage 5 arrives at the predetermined reversal position, it is detected by the sensor $S_2$ and the solenoid 76 is deenergized. Thereupon, the stopper 52 for forward movement is pivoted counterclockwise by the spring and the pawl portion 52a of the stopper 52 becomes disengaged from the ratchet wheel 43 for forward movement, and when the stopper 52 for forward movement is further pivoted counter-clockwise, the stopper-actuating lever 55 is moved in the direction of arrow E as shown in FIG. 1, and the fitting of the positioning pin 66 in the upper slot 65a of the positioning slot 65 is released. So, the stopper-actuating lever 55 is upwardly displaced by the backward movement change-over spring 79, and as regards the forward and reverse rotation change-over unit U, the pawl portions 52b and 53b of the two stoppers become disengaged from the ratchet wheels 43 and 43', so that the rotational force from the drive gear 50 is cut off and the original carriage 5 is stopped at the predetermined reversal position. When the solenoid 76 is again energized, the forward and reverse rotation change-over unit U assumes the state shown in FIG. 5 and the original carriage 5 is moved backward toward the start position as described above.

In the case of a copy, when the original carriage has come to the home position, the solenoid is deenergized by the detection output from a sensor $S_3$ which detects the home position, and the original carriage is stopped.

In the case of continuous copying, the original carriage is moved toward the start position beyond the home position and the above-described operation is repetitively performed.

Thus, in the above-described embodiment of the present invention, the forwardly and reversely moving member can be stopped at any position by the solenoid being deenergized and without the revolution of the drive motor being stopped.

Also, in whatever position the forwardly and reversely moving member may be, when the main switch is opened, the solenoid becomes deenergized and therefore, the connection between the forwardly and reversely moving member and the drive source is released.

Thus, by selecting the position for deenergizing the solenoid, the position for releasing the connection between the forwardly and reversely moving member and the drive source can be made plural or arbitrary.

I claim:

1. A forward and reverse rotation mechanism for transmitting the rotational force of a drive source rotating in one direction to a forwardly and reversely moving member through one of first spring clutch means for forward rotation and second spring clutch means for reverse rotation, comprising:

control lever means for controlling the operation of both said first spring clutch means and said second spring clutch means, said control lever means having a first lever member for said first spring clutch means and a second lever member for said second spring clutch means;

actuating means for actuating said first or said second lever member of said control lever means, said actuating means disengaging the drive source from said forwardly and reversely moving member when neither of said first and second lever members is actuated; and selected means for selecting the lever member actuated by said actuating means.

2. A mechanism according to claim 1, wherein said forwardly and reversely moving member has a reciprocally moving member reciprocally movable over a predetermined range, and said selecting means selects the lever member actuated by said actuating means in conformity with the moved state of said reciprocally moving member.

3. A mechanism according to claim 2, wherein said selecting means has a pressed member adapted to be pressed by said reciprocally moving means, and selects the lever member actuated by said actuating means in conformity with the position of said pressed member.

4. A mechanism according to claim 3, wherein a cam is provided on a portion of said reciprocally moving member and presses said pressed member.

5. A mechanism according to claim 4, wherein said forward and reverse rotation mechanism is used in an original reading apparatus, said reciprocally moving member is an original carriage moved while supporting an original thereon and said cam is provided at an end portion of said original carriage.

6. A mechanism according to claim 2, wherein said forward and reverse rotation mechanism is used in an original reading apparatus and said reciprocally moving member is an original carriage moved while supporting an original thereon.

7. A mechanism according to claim 1, further having detector means for detecting the position of said forwardly and reversely moving member and wherein the actuation of said actuating means is controlled on the basis of the result of the detection by said detector means.

8. A mechanism according to claim 1, wherein said selecting means comprises:
transmitting means connected to said actuating means, said transmitting means being displaceable to a first position in which it is capable of transmitting to said first lever member and a second position in which it is capable of transmitting to said second lever member; and
displacing means for selectively displacing said transmitting means to said first position and said second position.

9. A forward and reverse rotation mechanism according to claim 1, wherein said actuating means disengages a transmission route from the drive source to said forwardly and reversely moving member regardless of a position of said forwardly and reversely moving member, when said actuating means is OFF.

10. A forward and reverse rotation mechanism according to claim 1, wherein said actuating means is actuated by power, said actuating means being OFF when power is not supplied.

11. A forward and reverse rotation mechanism according to claim 1, wherein said actuating means is a solenoid.

12. A forward and reverse rotation mechanism for transmitting the rotational force of a drive source rotating in one direction to a forwardly and reversely moving member through one of first spring clutch means for forward rotation and second spring clutch means for reverse rotation, comprising:
control lever means for controlling the operations of said first and second spring clutch means;
actuating means for actuating said control lever means; and
connecting means for relating said actuating means and said control lever means in a position so that when said actuating means is in its ON state, said control lever means is selectively engaged with said first or said second spring clutch means and when said actuating lever means is in its OFF state, said control lever means is not engaged with said first and second spring clutch means regardless of the position of the forwardly and reversely moving member.

13. A forward and reverse rotation mechanism according to claim 12, wherein said actuating means is actuated by power, said actuating means being OFF when power is not supplied.

14. A forward and reverse rotation mechanism according to claim 12, wherein said actuating means is a solenoid.

15. A mechanism according to claim 12, wherein said forward and reverse rotation mechanism is used in an original reading apparatus and said forwardly and reversely moving member is an original carriage moved while supporting an original thereon.

16. A mechanism according to claim 12, further having selecting means for selecting the spring clutch means for actuating said control lever means.

17. A mechanism according to claim 16, wherein said selecting means selects the spring clutch means actuated by said control lever means in conformity with the moved state of said forwardly and reversely moving member.

18. A mechanism according to claim 17, wherein said selecting means has a pressed member adapted to be pressed by said forwardly and reversely moving member and selects the spring clutch means actuated by said control lever means in conformity with the position of said pressed member.

19. A mechanism according to claim 18, wherein a cam is provided on a portion of said forwardly and reversely moving member and presses said pressed member.

20. A mechanism according to claim 19, wherein said forward and reverse rotation mechanism is used in an original reading apparatus, said forwardly and reversely moving member is an original carriage moved while supporting an original thereon and said cam is provided at an end portion of said original carriage.

21. A mechanism according to claim 17, wherein said forward and reverse rotation mechanism is used in an original reading apparatus and said forwardly and reversely moving member is an original carriage moved while supporting an original thereon.

22. A mechanism according to claim 12, further having detector means for detecting the position of the forwardly and reversely moving member and wherein ON-OFF of said actuating means is controlled on the basis of the result of the detection by said detector means.

23. A forward and reverse rotation mechanism for transmitting a rotational force of a drive source rotating in one direction to a forwardly and reversely moving member through one of first spring clutch means for forward rotation and second spring clutch means for reverse rotation, comprising release means for disengaging the drive source from the forwardly and reversely moving member regardless of a position of the forwardly and reversely moving member, when power is not supplied to said release means.

24. A forward and reverse rotation mechanism according to claim 23, wherein said release means does not carry out said releasing when power is supplied thereto, the actuating force of the drive source being transmitted to the forwardly and reversely moving member.

25. A forward and reverse rotation mechanism for transmitting the rotational force of a drive source rotating in one direction to a forwardly and reversely moving member through a first spring clutch means for forward rotation and a second spring clutch means for reverse rotation, including:
operating means operated to transmit power from a driving source to the first or second spring clutch means, said operating means releasing a transmitting path from the driving source to the forwardly and reversely moving member regardless of the position of the moving member.

26. A forward and reverse rotation mechanism according to claim 25, wherein said operating means is actuated by an electrical power and to be in an off-state when the power is not supplied.

* * * * *

UNITED STATES PATENT AND TRADEMARK OFFICE
CERTIFICATE OF CORRECTION

PATENT NO. : 4,891,665
DATED : January 2, 1990
INVENTOR(S) : MORIKAZU MIZUTANI

It is certified that error appears in the above-identified patent and that said Letters Patent is hereby corrected as shown below:

COLUMN 2

Line 22, "embodiment" should read --embodiment of the--.

COLUMN 5

Line 55, "lower sot" should read --lower slot--.

COLUMN 8

Line 39, "selected means" should read --selecting means--.

Signed and Sealed this

Sixteenth Day of July, 1991

Attest:

*Attesting Officer*

HARRY F. MANBECK, JR.

*Commissioner of Patents and Trademarks*